Patented Aug. 16, 1927.

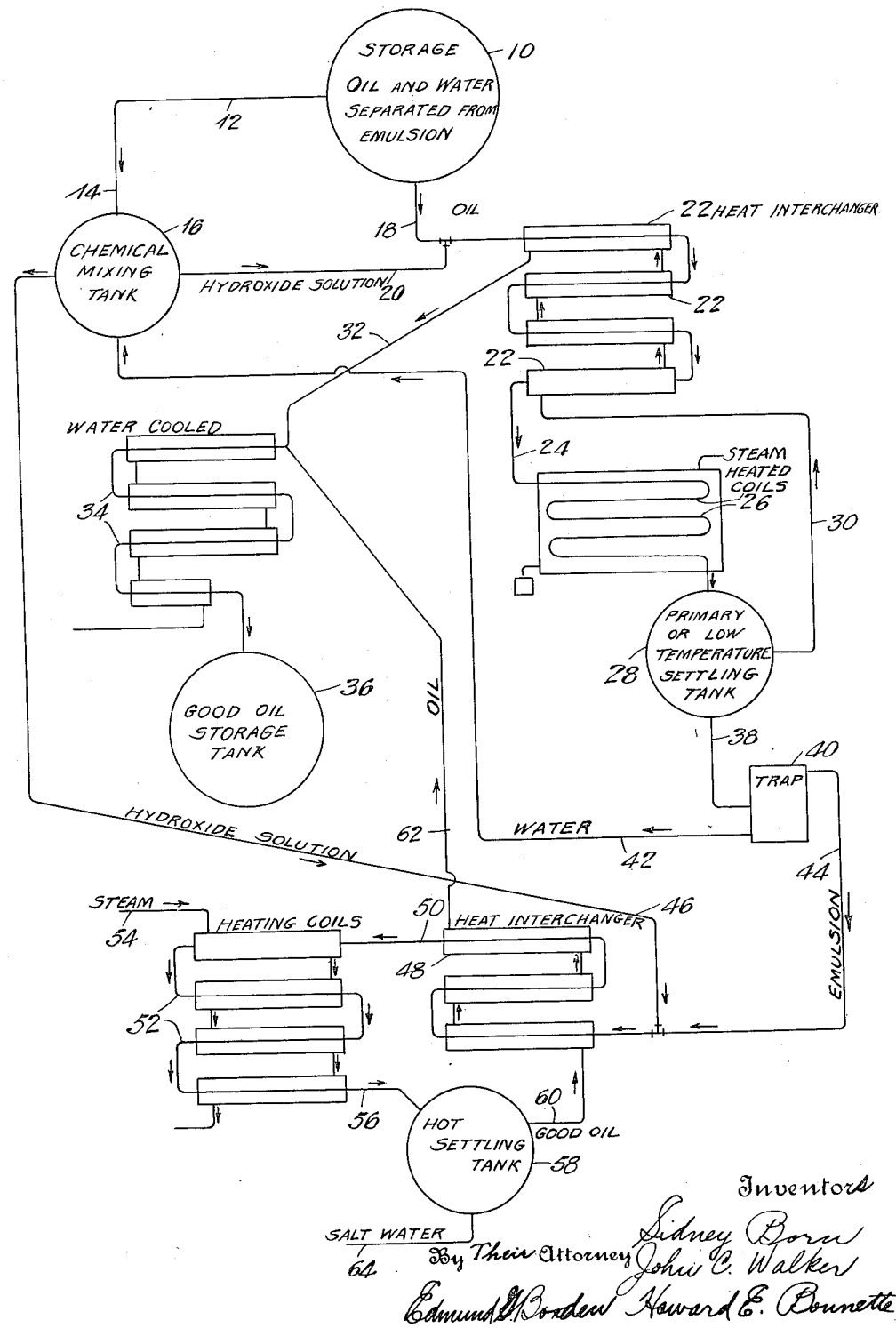

1,639,325

UNITED STATES PATENT OFFICE.

SIDNEY BORN AND HOWARD EDGAR BONNETTE, OF BARTLESVILLE, OKLAHOMA, AND JOHN CHARLES WALKER, OF ELDORADO, KANSAS, ASSIGNORS TO EMPIRE GASOLINE COMPANY, OF DOVER, DELAWARE, A CORPORATION OF DELAWARE.

PROCESS OF DEHYDRATING OILS.

Application filed April 20, 1920. Serial No. 375,222

This invention relates to a process of dehydrating oils and more particularly to a process of separating water from crude petroleum containing natural brine in the form of suspended particles or of an emulsion of water in oil.

Petroleum from wells in many oil producing localities carries with it large quantities of salt water which occurs in the oil producing formation or in strata above or below the oil producing formation, and which becomes mixed with and is carried by the petroleum as it flows from the well. This water, which usually contains chlorides, sulphates, and other salts in solution, is disseminated thruout the oil in a large number of particles varying in size from comparatively large drops which readily separate out of the mixture on standing, to minute particles of microscopic or ultramicroscopic size which form a substantially permanent emulsion with the oil. These minute particles do not separate from the body of oil even upon long standing, but may be separated from some types of emulsion by heating or by the addition of substances of an alkaline nature which act to precipitate or settle the particles of water.

The water precipitated in this manner frequently does not separate as a clear liquid but is mixed with a large quantity of oil, with which it forms a thick, semi-solid or solid, mass, commonly known as "bottom settlings" or "B. S." The bottom settlings or B. S. has many of the properties of semi-solid emulsions or gels and is apparently formed of minute particles of water or salt solution of microscopic or ultramicroscopic size surrounded by films of oil adsorbed or otherwise held to the surface of the particles of water or salt solution and forming a network within which the particles are tenaciously held. This mixture of oil and water can not be broken up by the methods or means commonly employed to separate water from the body of oil, and because of its water content and its lack of fluidity can not be transported to refineries or refined. It not only involves a loss because of the oil it contains, but also constitutes a nuisance because of its offensive nature and of the difficulty of disposing of it.

The primary object of the present invention is to provide a process by which a mixture or emulsion of oil and water may be separated into clear oil and water.

Another object of the present invention is to provide a process of dehydrating oil by which the formation of bottom settlings or semi-solid emulsions is avoided and by which bottom settlings may themselves be broken up into clear oil and water.

Another object of the invention is to provide a material by which an emulsion or suspension of water in oil may be substantially completely removed from the oil.

When oil is treated by means of chemicals, the cost of the chemicals constitutes a large item of expense. This is true even in cases in which the quantity of the chemicals appears to be small relatively to the volume of the oil to be treated, because the quantities of oil to be treated are so enormous that a quantity of chemical equal to a very small percent of the oil would be quite large in the aggregate.

A further object of the present invention is, therefore, to provide a process of dehydrating oils in which a quantity of reagent used in the treatment is reduced to a minimum.

A further object of the invention is to provide an agent for precipitating and breaking up an emulsion of water in petroleum.

With these and other objects in view, the invention consists in the process described in the following specification and defined in the claims.

The main steps of the process are illustrated diagrammatically in the flow sheet shown in the accompanying drawings.

In the present invention, the mixture or emulsion of oil and water to be dehydrated is treated with a saline solution of substantially the same composition and salt content as that carried in suspension in the oil, and which contains in addition a small quantity of sodium hydroxide. This solution of salts and hydroxide is most conveniently obtained by adding sodium hydroxide to salt water which has been separated from the oil by a previous treatment with an alkali solution or by adding sodium hydroxide to salt water which has been obtained by settling water from the oil coming from the wells. When the emulsion of oil and water is treated with alkali salt solution prepared in this manner, the particles of salt solution suspended in the petroleum separate out as a clear solution without the formation of a semi-solid gel or bottom settlings or at the most with a small quantity of gel. Whatever gel is formed may be for the most part decomposed by a second treatment with an additional quantity of the alkaline solution and heating to a somewhat higher temperature. The cause of this peculiar decomposing action of the salt and alkali and the manner in which it acts on the dispersed particles of water is not known with certainty. The mixed solution appears to have a precipitating action due to the mutual discharge of the static electricity on the suspended particles of water, caused by the presence of hydroxyl ions, and in addition to have the property, due to the combined influence of the salts and hydroxyl ions of altering the composition or character of the dividing surface between the oil and suspended water particles, or of changing the surface tension or other characteristics of the suspended particles so as to break up the adhering films or network of oil enclosing the precipitated particles and permit the particles to coalesce and unite into a single body. This latter action appears to be due largely to the presence of the salts, as the hardness of the well water is not appreciably affected by the addition of the alkali. Its action is much different in this respect than that of a solution of alkali in soft water or in water which does not contain much salt in solution.

In order to avoid the use of an excessive amount of alkali, all of the water which will separate from the oil without the addition of alkali is permitted to settle out of the mixture of oil and water before any alkaline solution is added. An amount of sodium hydroxide is mixed with the separated salt solution to form a solution containing from .2 to .4 per cent of sodium hydroxide. The alkali solution prepared in this manner is then mixed with oil from which all water which will readily separate by gravity has been removed and which still contains the more minute particles of salt solution forming a more or less permanent emulsion with the oil. The mixture of oil emulsion and alkali solution is then heated and the heated mixture allowed to stand, whereupon the saline solution separates from the main body of the oil as a comparatively clear liquid. Any emulsion which remains after this treatment is decomposed by a second treatment with an additional quantity of alkaline solution and heating to a higher temperature.

Referring to the flow sheet shown in the accompanying drawings, the mixture of oil and water to be treated is run into a storage tank 10 in which the major portion of the water separates as a clear liquid and is withdrawn thru a draw-off pipe 12. A portion of the salt water is taken from the pipe 12 through a branch pipe 14 to a mixing tank 16 in which an amount of sodium hydroxide sufficient to form a solution of from .2 to .4 per cent of sodium hydroxide is added. The concentration of the sodium hydroxide in the solution may vary between these limits or may vary slightly from these limits, but for the best results, should not be below .1 or above .5 per cent.

The oil remaining after the withdrawal of water from the tank 10 contains salt water held as a more or less permanent emulsion which will not separate upon standing, is withdrawn through a draw-off pipe 18 and mixed with alkali salt solution withdrawn from the tank 16 through a draw-off pipe 20. The amount of alkali solution added to the oil will vary, of course, with the nature of the emulsion and with the quantity of emulsion in the oil. An oil containing approximately 10 per cent of emulsion will require a solution containing approximately 9 lbs. of sodium hydroxide for 100 bbls. of oil.

The mixture of oil and alkaline solution formed in the pipe 18 is passed through the heat receiving compartment of a number of heat interchangers 22 in which it is heated by hot oil produced in later steps of the process. From the heat interchangers 22 the mixture of oil and alkali solution passes through a pipe 24 to steam heated coils 26 which are heated to a temperature of from 150° to 160° F. At this temperature the emulsion of oil and water is largely broken up and passes to a primary or low temperature settling tank 28 in which the water separates out leaving a body of oil substantially free from water. The clear oil is then withdrawn from the tank 28 through a pipe 30 and passed through the heating compartments of the heat interchangers 22 in which it gives up its heat to the cold oil entering the interchangers through the pipe 18. From the heat interchangers 22, the oil flows through a pipe 32 to water cooled coils 34 in which its temperature is reduced to normal and then flows into a storage tank 36.

The water remaining in the tank 28 after the removal of the oil may contain a small amount of an emulsion or gel of water and oil. To remove the emulsified oil, the water is withdrawn from the tank 28 through a pipe 38 to a trap 40 in which the clear water is separated from the gel or emulsion and returned through a pipe 42 to the mixing tank 16. By returning the water from the trap 40 to the tank 16, a large part of the alkali is returned to the process and saved. During the treatment of the oil, the alkali tends to absorb sulphur or sulphur compounds and other impurities from the oil and to become unfit for further use. When the solution becomes impregnated with impurities, it is, therefore, not returned to the mixing tank but is discarded.

The emulsion or gel remaining in the trap 40 after the removal of the water is withdrawn through a pipe 44 and mixed with additional alkali solution supplied from the tank 16 through a pipe 46. The mixture of gel or emulsion and alkali solution formed in the pipe 44 enters the heat receiving compartment of a heat interchanger 48 in which it is heated by hot oil produced in a later step of the process and from the heat interchanger 48 passes through a pipe 50 to steam heated coils 52. In the coils 52 the mixture of oil and alkali solution is heated to approximately 180° F. by means of steam supplied from a pipe 54. By this second treatment substantially all of the emulsion is broken up into clear oil and water. The heated mixture of oil and alkaline solution is withdrawn from the heated coils 52 through a pipe 56 to a settling tank 58 in which the water or salt solution settles out of the mixture leaving a clear body of oil. The clear oil is removed from the tank 58 through a pipe 60 and passed through the heating compartment of the heat interchanger 48 giving up its heat to the cooler oil from the pipe 44. From the heat interchanger 48 the cooled oil passes through a pipe 62 to the pipe 32 in which it mixes with oil from the primary settling tank 28 and enters the cooling coils 34. In the cooling coils 34 the oil is reduced to normal temperature and flows into the storage tank 36. The salt water remaining in the tank 58 after the removal of the oil is withdrawn through a pipe 64 to centrifugals which remove any particles of oil which may be entrained therein, or may be run directly to a waste.

By thus removing all of the water possible without the use of reagents before adding any reagent and by progressively increasing the quantity and concentration of reagent in the treated mixture only after the removal of all the water possible with lower concentrations, the quantity of oil and water, and accordingly the quantity of reagent used is reduced to a minimum. By re-using the alkali solution until it becomes impregnated with impurities a further saving of chemicals is effected and the consumption of chemicals is reduced to a minimum.

Having described the invention, what is claimed as new is:

1. A process of dehydrating petroleum which comprises separating water from said petroleum, adding a hydroxide of an alkali metal to said separated water in an amount less than that required to substantially affect the hardness of the water associated with the oil, and mixing said alkali solution with said petroleum.

2. A process of dehydrating petroleum containing salt water which comprises forming a solution of an alkali hydroxide in salt water of substantially the same composition as that contained in said oil, mixing with said oil said alkali solution in an amount less than that required to substantially affect the hardness of the water associated with the oil, heating said mixture and permitting the water to settle out of said oil.

3. A process of separating water from a naturally occurring mixture of water and oil, which comprises adding to said mixture a solution of an alkali hydroxide in water of substantially the same composition as that contained in said oil, the amount of hydroxide in said solution being insufficient to substantially affect the hardness of the water associated with the oil.

4. A process of dehydrating petroleum containing a saline solution in suspension which comprises mixing with said petroleum a saline solution of substantially the same composition as that contained in suspension in the petroleum and containing in addition a material furnishing hydroxyl ions in an amount such that it will not substantially affect the hardness of the saline solution associated with the oil.

5. A process of separating salt water from petroleum which comprises mixing with said petroleum salt water of substantially the same composition as that contained in the petroleum and containing in addition not more than .5 per cent of an alkali hydroxide.

6. A process of separating salt water from petroleum which comprises mixing with said petroleum a saline solution of substantially the same composition as that contained in the petroleum and containing, in addition, not less than .1 per cent nor more than .5 per cent of sodium hydroxide.

7. A material for separating salt water from an emulsion of petroleum and salt water which comprises salt water obtained from the said emulsion, and an alkali hydroxide to the extent of between .1 and .5 percent of the solution.

8. A process of dehydrating oils which comprises removing from the oil water which is separable by gravity, dissolving a hydroxide of an alkali metal in a portion of said water, mixing said alkali hydroxide solution with said separated oil, heating said mixture of oil and alkali solution to approximately 150° to 160° F., removing the oil and water thereby separated from the permanent emulsion, adding an additional quantity of alkali solution to the emulsion remaining, heating said emulsion to approximately 180° F., and separating the oil from the water of said heated emulsion.

9. A process of dehydrating oils which comprises removing water from the oil, heating said oil and water remaining in said oil to approximately 150° to 160° F., removing the oil separating from the mixture upon said heating, cooling said oil successively by a mixture of oil and alkali solution and by cold water, separating the water from the mixture of oil and water after said heating and using said water in making up an alkali solution, adding said alkali solution to the emulsion remaining, heating said mixture of emulsion and alkali to approximately 180° F., and removing the water from the oil separated upon said second heating.

10. A process of dehydrating oil which comprises mixing said oil with an alkaline solution, containing from .1 to .5 per cent of caustic alkali, heating said mixture and permitting the water to separate from the oil.

11. A process of dehydrating oil containing an emulsion of oil and salt water which comprises adding to the oil a solution of a material furnishing hydroxyl ions dissolved in salt water of substantially the same composition as that contained in the emulsion, the amount of said material being insufficient to substantially affect the hardness of the water associated with the oil.

12. The process of treating petroleum brine emulsion comprising separating brine and oil from an oil-brine emulsion and adding a solution of said brine and an alkali to said emulsion, the amount of said solution being insufficient to substantially affect the hardness of the water associated with the oil.

In testimony whereof we affix our signatures.

SIDNEY BORN.
JOHN CHARLES WALKER.
HOWARD EDGAR BONNETTE.